US012173598B1

(12) United States Patent
Tian et al.

(10) Patent No.: US 12,173,598 B1
(45) Date of Patent: Dec. 24, 2024

(54) METHOD AND SYSTEM FOR GR LWD CURVE OPTIMIZATION FOR DEEP-FIELD OIL AND GAS PRECISE NAVIGATION

(71) Applicant: Institute of Geology and Geophysics, Chinese Academy of Sciences, Beijing (CN)

(72) Inventors: Fei Tian, Beijing (CN); Qingyun Di, Beijing (CN); Wenhao Zheng, Beijing (CN); Yongyou Yang, Beijing (CN); Wenjing Cao, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/415,710

(22) Filed: Jan. 18, 2024

(30) Foreign Application Priority Data

Oct. 18, 2023 (CN) .......................... 202311346455.4

(51) Int. Cl.
*E21B 44/00* (2006.01)
*E21B 7/04* (2006.01)
*E21B 47/022* (2012.01)
*E21B 47/04* (2012.01)
*E21B 49/00* (2006.01)
*G01V 5/04* (2006.01)

(52) U.S. Cl.
CPC ................ *E21B 44/00* (2013.01); *E21B 7/04* (2013.01); *E21B 47/022* (2013.01); *E21B 47/04* (2013.01); *E21B 49/00* (2013.01); *G01V 5/04* (2013.01); *G01V 5/045* (2013.01)

(58) Field of Classification Search
CPC ........ E21B 44/00; E21B 47/022; E21B 47/04; E21B 49/00; G01V 5/04
USPC ............................................................ 702/9
See application file for complete search history.

(56) References Cited

U.S. PATENT DOCUMENTS

| 8,701,012 B1 * | 4/2014 | Selman .................... G01V 1/40 |
| | | 715/738 |
| 2015/0098627 A1 * | 4/2015 | Ye ........................... E21B 49/00 |
| | | 382/109 |

(Continued)

FOREIGN PATENT DOCUMENTS

| CN | 103867194 A | 6/2014 |
| CN | 111737868 A | 10/2020 |
| CN | 114677460 A | 6/2022 |

*Primary Examiner* — Ricky Go
(74) *Attorney, Agent, or Firm* — Nitin Kaushik (57) ABSTRACT

The present invention is in the field of geological exploration and particularly relates to a method and system for gamma ray (GR) while drilling parameter data optimization for deep-filed oil and gas precise navigation, aiming to solve the problem of insufficient measurement accuracy of the depth of a well in the existing drilling technology. The present invention comprises: eliminating outliers from the obtained GR while drilling parameter data and determining the rationality of the eliminated outlier; performing derivation on a real-time updated variance attribute while drilling curve to obtain a real-time updated formation change-point detection result; searching the formation change-point detection result of a pre-drilling predicted well curve; and correcting the drilling depth by comparing the two formation change-point detection results to obtain the accurate depth while drilling.

2 Claims, 2 Drawing Sheets (56) References Cited

U.S. PATENT DOCUMENTS

| | | | |
|---|---|---|---|
| 2016/0146970 A1* | 5/2016 | Banas | G01V 1/50 |
| | | | 702/11 |
| 2017/0328181 A1* | 11/2017 | Kristjansson | G06Q 10/06 |
| 2021/0255348 A1* | 8/2021 | Hornby | G01V 1/50 |

* cited by examiner

METHOD AND SYSTEM FOR GR LWD CURVE OPTIMIZATION FOR DEEP-FIELD OIL AND GAS PRECISE NAVIGATION

CROSS-REFERENCE TO RELATED APPLICATIONS

The application claims priority to Chinese patent application No. 202311346455.4, filed on Oct. 18, 2023, the entire contents of which are incorporated herein by reference.

TECHNICAL FIELD

The present invention is in the field of geological exploration and particularly relates to a method and system for gamma-ray (GR) logging-while-drilling (LWD) curve optimization for deep-filed oil and gas precise navigation.

BACKGROUND

Deep precise navigation technology can be used for deep-filed oil and gas exploration to guide drilling personnel to optimize well trajectory to the designated location of oil and gas reservoir to obtain the maximum drainage area and the best recovery rate, which is the leading technology to improve the oil and gas production per well and the benefit of oil field development. In the process of real-time drilling, the non-formation factors such as instruments drilling fluid have a non-negligible effect on the logging curve, which disturbs the follow-up inversion of formation lithology. Therefore, there is a need for an optimization algorithm suitable for logging-while-drilling (LWD) data to eliminate the dimensional difference of logging curves of different well times, the noise influence of non-formation factors, and the measured depth error, and improve the accuracy and efficiency of the reservoir prediction while drilling model.

SUMMARY

In order to solve the above-mentioned problem in the prior art, i.e. the problem of insufficient measurement accuracy of the depth of a well in the prior art of drilling, the present invention provides a method for gamma-ray (GR) logging-while-drilling (LWD) curve optimization for deep-filed oil and gas precise navigation, the method comprising:

Step S100, acquiring GR while drilling parameter data in real-time and performing outlier processing to obtain GR curve data with outliers eliminated, the GR while drilling parameter data GR while drilling parameter data being obtained in the form of a batch; and acquiring historical GR curve data of a drilled well;

Step S200, stretching and translating the GR curve data with outliers eliminated of the current batch according to the historical GR curve data to obtain a normalized GR while drilling parameter data;

Step S300, determining the rationality of the normalized GR while drilling parameter data and historical GR curve data to obtain a rationality determination result; if the rationality determination result passes, proceeding to Step S400; if the rationality determination result fails, proceeding to Step S100, adjusting the determination condition of the outlier processing and re-performing the rationality determination;

Step S400, performing waveform indication inversion based on the historical GR curve data of the drilled wells to obtain a waveform indication inversion data volume of the drilled wells;

Step S500, acquiring a pre-drilling predicted well curve based on the waveform indication inversion data volume of the drilled well and a pre-designed drilling trajectory;

Step S600, performing variance attribute feature extraction based on the normalized GR while drilling parameter data to obtain a real-time updated variance attribute while drilling curve; and perform variance attribute feature extraction based on the pre-drilling predicted well curve to obtain a variance attribute curve of the pre-drilling predicted well curve;

Step S700, performing derivation based on the real-time updated variance attribute while drilling curve to obtain a real-time updated formation change-point detection result; and performing derivation based on the variance attribute curve of the pre-drilling predicted well curve to obtain a formation change-point detection result of the pre-drilling predicted well curve;

Step S800, acquiring 4 set control points based on the real-time updated formation change-point detection result and the formation change-point detection result of the pre-drilling prediction well curve, and performing depth transformation based on the 4 set control points to obtain an accurate depth while drilling; and Step S900, completing accurate depth correction of the current batch based on the accurate depth while drilling, and returning to Step S100, determining the accurate depth while drilling based on GR while drilling parameter data GR while drilling parameter data of the next batch.

In some preferred embodiments, the outlier pressing specifically comprises:

presetting a determination radius r and a discrimination ratio s with a sample point as the center of a circle;

extracting a first sample point p from the GR while drilling parameter data GR while drilling parameter data of the current batch without replacement, and determining the first sample point p through an outlier determination formula, wherein the outlier determination formula is:

$$\text{OutlierSet}(r, s) = \left\{ p \,\middle|\, \frac{\text{Card}(\{q \in \text{batch} \mid \text{dist}(p,q) < r\})}{\text{Card}(\text{batch})} \leq s \right\};$$

$$\text{dist}(p,q) = \text{sqrt}(p(x_1, x_2, \ldots, x_d) - q(x_1, x_2, \ldots, x_d));$$

where OutlierSet(r,s) represents a determination value that a first sample point p is an outlier under the condition of the pre-set determination radius r and the discrimination ratio s; Card represents a counting function; Card(batch) represents a counting operator in one batch; Card ({q∈ batch|dist(p,q)<r}) represents the number of adjacent points which determine that a sample point q is the sample point p when extracting the sample point q without replacement in one batch; and dist(p,q) refers to the Euclidean distance between the sample point p and the sample point q;

when the value of OutlierSet(r,s) is greater than a pre-set threshold, an outlier is determined, and the corresponding first sample point is eliminated.

In some preferred embodiments, the Step S200 specifically comprises:

Step S210, calculating a mean estimation value $GR_{mean}$ and a variance estimation value $GR_{var}$ of the GR while drilling parameter data with outliers eliminated of the current batch;

$$GR_{mean} = \frac{\sum_{i=1}^{i=Card(batch)} GR_i}{Card(batch)};$$

$$GR_{var} = \sqrt{\frac{1}{Card(batch)}\sum_{j=1}^{N}(GR_j - GR_{mean})^2};$$

where Card(batch) represents a counting operator in a batch; j represents a sample sequence number; i represents a sample sequence number; and N has the same value as Card(batch);

Step S220, calculating a standard deviation $\sigma_h$ of the historical GR curve data, and performing a stretching and compression transformation on the GR curve data with outliers eliminated of the current batch;

$$stretch_k = GR_{mean} + (GR_k - GR_{mean}) * \frac{\sigma_h}{GR_{var}};$$

where $stretch_k$ represents the GR data obtained after the stretching and compression transformation; and $GR_k$ represents the GR value of the $k^{th}$ sample point of the GR while drilling parameter data with outliers eliminated of the current batch; and Step S230, performing a translation transformation on the GR data obtained after the stretching and compression transformation based on a mean value standard value $\mu_h$ of historical GR curve data;

$$offset_v = stretch_k + (\mu_h - GR_{mean});$$

where $offset_v$ represents the normalized GR while drilling parameter data obtained after translation transformation.

In some preferred embodiments, the Step S300 specifically comprises:

Step S310, respectively calculating a probability distribution curve $L_1$ of the transformed GR while drilling parameter data and a probability distribution curve $L_2$ of GR parameter data of the drilled well;

Step S320, calculating a probability distribution curve area intersection set $U_1$ and a probability distribution curve area union set $U_2$ based on the $L_1$ and $L_2$;

Step S330, calculating a quality control parameter $U = U_1/U_2$ based on the $U_1$ and $U_2$; and Step S340, comparing the quality control parameter U with a set quality control threshold;

if the quality control parameter U is greater than or equal to the set quality control threshold, the rationality determination result passes, proceeding to Step S400; and if the quality control parameter U is less than the set quality control threshold, the rationality determination result fails, proceeding to Step S100, and adjusting the determination radius r and the discrimination ratio s of the center of the circle.

In some preferred embodiments, the Step S400 specifically comprises:

using the white noise satisfies the Gaussian distribution, representing historical GR curve data of the drilled well as:

$$Y_{sim} = X_{sim} + \xi_1;$$

where $Y_{sim}$ represents historical GR curve data of the drilled well; $X_{sim}$ represents a waveform indication inversion data volume to be solved of the drilled well; and $\xi$ represents random noise;

according to the central limit theorem, $\|X_{sim} - X_p\|^2$ also satisfies the Gaussian distribution, determining an initial objective function as:

$$J_1 = \frac{\|X_{sim} - X_p\|^2}{2\sigma^2};$$

where $J_1$ represents a function related to the posterior information; $X_p$ represents an expected value of the GR curve calculated by obtaining the posterior probability statistical distribution density after matching and filtering historical GR curve data of the drilled well; and $\sigma^2$ represents the covariance of the white noise;

based on the initial objective function, introducing priori information into the objective function through maximum a posteriori estimation to obtain a stable objective function as:

$$J(Z_{sim}) = J_1(Z_{sim}) + \lambda^2 J_2(Z_{sim});$$

wherein $Z_{sim}$ represents a simulated characteristic parameter; $J_2$ represents a function related to prior information of geological and logging data; and $\lambda$ represents a smoothing parameter for coordinating the interaction between $J_1$ and $J_2$; and taking the stable objective function as an input of the initial model, sampling the posterior probability distribution by the Markov chain Monte Carlo (MCMC) method and the Metropolis-Hastings sampling criterion, continuously optimizing the parameters of the initial model, selecting the solution when the objective function takes the maximum value as a random implementation, taking the mean value of multiple random implementations as an expected value output, and taking the expected value output as the waveform indication inversion data volume of the drilled well.

In some preferred embodiments, the Step S600 specifically comprises:

setting a time window with a size of w, based on the normalized GR while drilling parameter data, taking the serial number of the current actual measured point as MP, and calculating a local variance value MPvar within the range of (MP-w, MP):

$$MPvar = \frac{\sum_{n=1}^{n=w}(GR_n - mean(GR))^2}{w};$$

$$mean(GR) = \frac{\sum_{n=1}^{n=w} GR_n}{w};$$

where mean (GR) represents the local mean value of GR curve data; $GR_n$ represents the value of GR curve data of the $n^{th}$ sample point; and n represents the sequence number of the sample point; calculating the local variance values of all the actual measured points to obtain the variance attribute while drilling curve; and performing variance attribute feature extraction on the pre-drilling predicted well curve through the same size w window to obtain a variance attribute curve of the pre-drilling predicted well curve.

In some preferred embodiments, the Step S700 specifically comprises:
performing derivation based on the variance attribute while drilling curve to obtain a first variance transient attribute dvar:

dvar=der(MPvar);

where der represents a derivation operator; the maximum value of the first variance transient attribute is a real-time updated formation change-point detection result, and at least two change-points are obtained, namely, a second change-point $Z_2$ and a fourth change-point $Z_4$;

performing derivation based on the variance attribute curve of the pre-drilling predicted well curve to obtain a second variance transient attribute, wherein the maximum value of the second variance transient attribute is the formation change-point detection result of the pre-drilling predicted well curve.

In some preferred embodiments, the 4 control points specifically comprise:
a first control point: point $Z_1$ of the pre-drilling predicted well curve with a measured depth of zero, the depth being $TVD(Z_1)$;
a second control point: formation change-point $Z_2$ of the pre-drilling predicted well curve, the depth being $TVD(Z_2)$;
a third control point: point $Z_3$ of the LWD curve with a measured depth of zero, the depth being $TVD(Z_3)$; and
a fourth control point: formation change-point $Z_4$ of the LWD curve, the depth being $TVD(Z_4)$.

In some preferred embodiments, said performing a depth transformation based on the 4 set control points to obtain an accurate depth while drilling specifically comprises:

$$TTVD(d) = TVD(Z_3) + \frac{(TVD(Z_2) - TVD(Z_1))}{(TVD(Z_4) - TVD(Z_3))} * (TVD(d) - TVD(Z_3));$$

where TTVD(d) represents the accurate depth corresponding to the dth sample point after depth transformation, and TVD(d) represents the depth value corresponding to the dth sample point after depth transformation.

In another aspect of the present invention, provided is a system for GR while drilling parameter data GR while drilling parameter data optimization for deep-field oil and gas precision navigation, the system comprising:
an outlier elimination module configured to acquire GR while drilling parameter data in real-time and perform outlier processing to obtain GR curve data with outliers eliminated, the GR while drilling parameter data being obtained in the form of a batch, and acquire historical GR curve data of a drilled well;
a normalization module configured to stretch and translate the GR curve data with outliers eliminated of the current batch according to the historical GR curve data to obtain a normalized GR while drilling parameter data;
a rationality determination module configured to determine the rationality of the normalized GR while drilling parameter data and historical GR curve data to obtain a rationality determination result; if the rationality determination result passes, proceed to a waveform indication inversion module; if the rationality determination result fails, proceed to an outlier eliminating module, adjust the determination condition of the outlier processing and re-perform the rationality determination;
the waveform indication inversion module configured to perform waveform indication inversion based on the historical GR curve data of the drilled well to obtain a waveform indication inversion data volume of the drilled well;
a pre-drilling predicted well curve calculation module configured to acquire a pre-drilling predicted well curve based on the waveform indication inversion data volume of the drilled well and a pre-designed drilling trajectory;
a variance attribute curve calculation module configured to perform variance attribute feature extraction based on the normalized GR while drilling parameter data to obtain a real-time updated variance attribute while drilling curve; and
perform variance attribute feature extraction based on the pre-drilling predicted well curve to obtain a variance attribute curve of the pre-drilling predicted well curve;
a change-point detection module configured to perform derivation based on the real-time updated variance attribute while drilling curve to obtain a real-time updated formation change-point detection result; and
perform derivation based on the variance attribute curve of the pre-drilling predicted well curve to obtain a formation change-point detection result of the pre-drilling predicted well curve;
an accurate depth calculation module configured to acquire 4 set control points based on the real-time updated formation change-point detection result and the formation change-point detection result of the pre-drilling prediction well curve, and perform depth transformation based on the 4 set control points to obtain an accurate depth while drilling; and
a depth correction module configured to complete accurate depth correction of the current batch based on the accurate depth while drilling, and return to the outlier eliminating module to determine the accurate depth while drilling based on GR while drilling parameter data of the next batch.

Advantageous Effect of the Invention (1) The partial normal distribution fitting algorithm is applied to the statistical description of logging curve data. The mean and variance parameters of normal distribution are used to quantitatively standardize the logging curve, and the coverage area ratio of normal probability distribution is used to quantitatively control the quality, and further control the quality of the effect of eliminating outliers. A novel method using control points to correct drilling depth is proposed to effectively reduce the actual measured depth error, eliminate the dimensional difference of logging curves of different well times, the noise influence of non-formation factors, and the measured depth error, and improve the accuracy and efficiency of the reservoir prediction while drilling model.

BRIEF DESCRIPTION OF DRAWINGS

Other features, objects, and advantages of the application will become more apparent from reading the detailed description of non-limiting embodiments with reference to the following drawings.

DETAILED DESCRIPTION OF THE EMBODIMENTS

The present application will now be described in further detail with reference to the accompanying drawings and examples. It should be understood that the particular embodiments described herein are illustrative only and are not restrictive. It should also be noted that, for ease of description, only some, but not all, of the structures associated with related inventions are shown in the drawings.

It is noted that the embodiments of the application and features of the embodiments may be combined with each other without conflict. The present application will now be described in detail in connection with the embodiments with reference to the accompanying drawings.

Gamma-ray (GR) logging-while-drilling (LWD) curves are uploaded in real-time during the drilling process, which may cause abnormal points due to the instrument and wellbore environment. Because the formation and LWD tools are different from the wireline logging standards, the measured data and the measured curve data have dimensional differences. In the measurement while drilling, the drilling rate changes due to the formation lithology difference. The measured sampling rate changes greatly with the LWD curve, and the measured well depth is also affected, so this scheme is proposed.

Figure 1A:
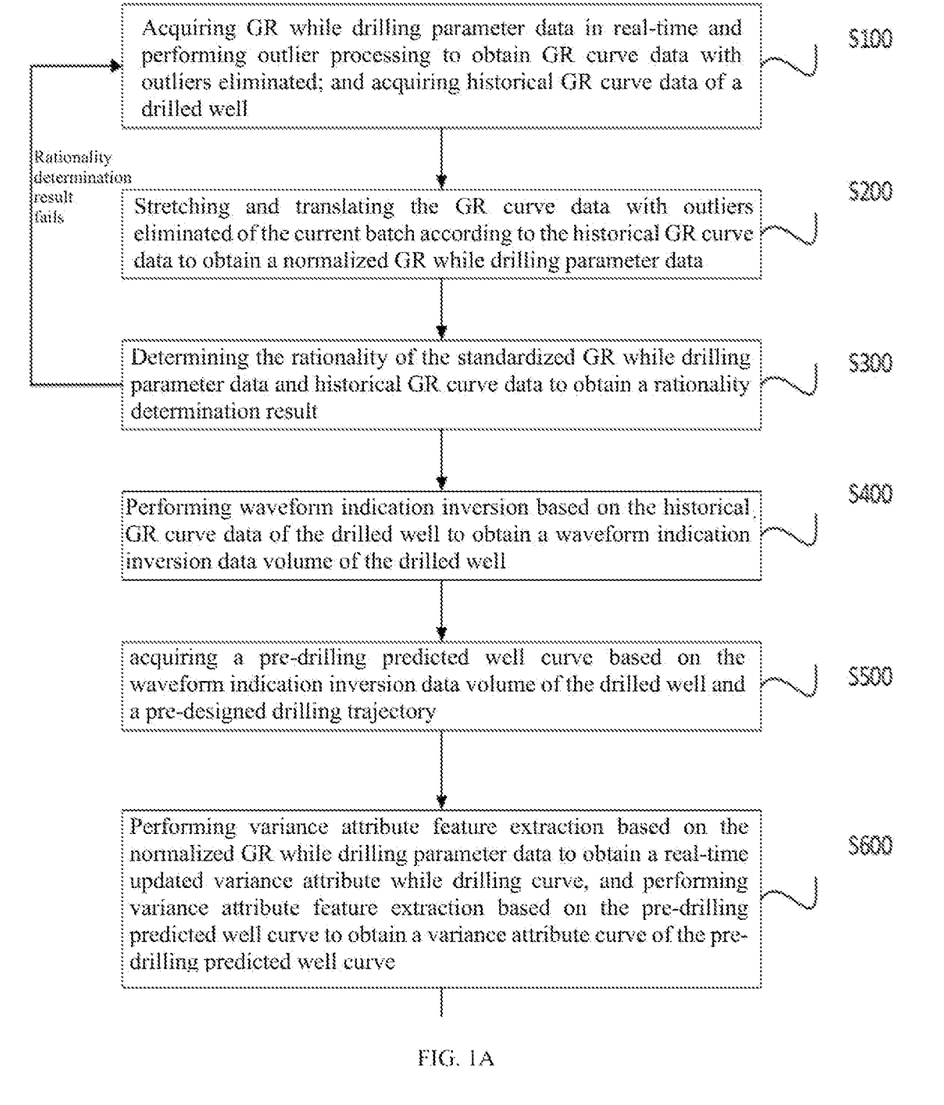
FIGS. 1A and 1B is a schematic flow diagram of a method for GR while drilling parameter data GR while drilling parameter data optimization for deep-field oil and gas precision navigation according to an embodiment of the present invention.
Figure 1B:
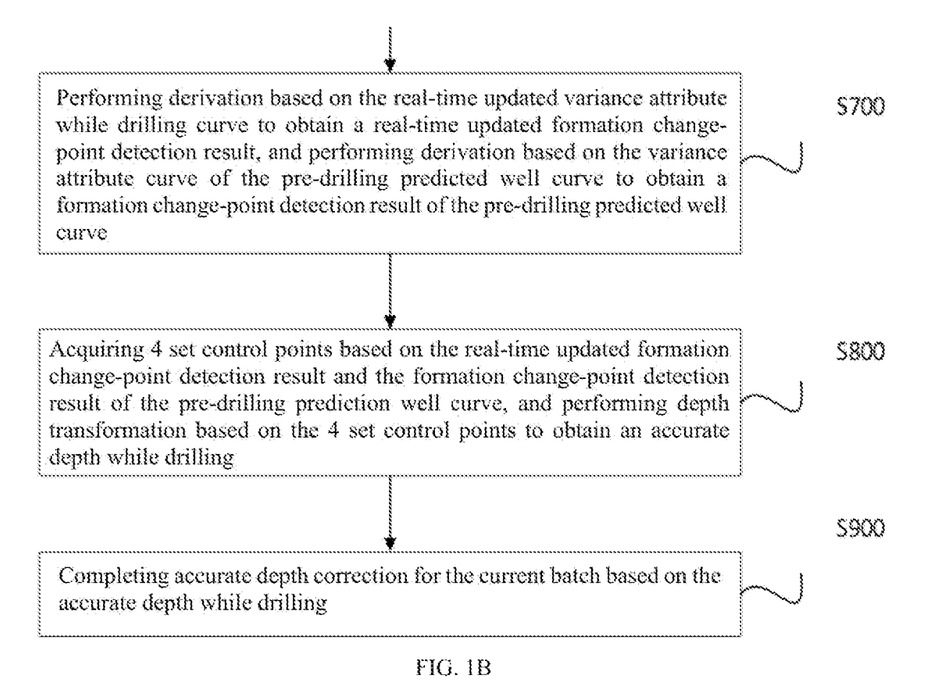

In order to more clearly describe the method for GR while drilling parameter data optimization for deep-field oil and gas precision navigation according to the present invention, the steps of an embodiment of the present invention will be described in detail with reference to FIGS. 1A and 1B.

The method for GR while drilling parameter data optimization for deep-field oil and gas precision navigation according to a first embodiment of the present invention comprises steps S100-S900, and the steps are described in detail as follows:

Step S100, acquiring GR while drilling parameter data in real-time and performing outlier processing to obtain GR curve data with outliers eliminated, the GR while drilling parameter data being obtained in the form of a batch, so that the latest data processing can be used step by step to ensure the real-time performance of the generated model to adapt to the changes of geological conditions at different depths;

In this embodiment, the number m of logging curve data points in a batch is preset for the actual formation condition of the target position, and initialization: setting n=0;

n=n+1 for each sample point measured while drilling;

when n is equal to m, the currently obtained n sample points are treated as a batch;

resetting n=0; and data are output according to batch while drilling;

In this embodiment, the outlier processing specifically comprises:

presetting a determination radius r and a discrimination ratio s with a sample point as the center of a circle;

extracting a first sample point p from the GR while drilling parameter data of the current batch without replacement, and determining the first sample point p through an outlier determination formula, wherein the outlier determination formula is:

$$\text{OutlierSet}(r, s) = \left\{ p \mid \frac{\text{Card}(\{q \in \text{batch} \mid dist(p, q) < r\})}{\text{Card(batch)}} \leq s \right\};$$

$$dist(p,q) = \text{sqrt}(p(x_1, x_2, \ldots, x_d) - q(x_1, x_2, \ldots, x_d));$$

where OutlierSet(r,s) represents a determination value that a first sample point p is an outlier under the condition of the pre-set determination radius r and the discrimination ratio s; Card represents a counting function; Card(batch) represents a counting operator in one batch; Card({q∈batch|dist(p,q)<r}) represents the number of adjacent points which determine that a sample point q is the sample point p when extracting the sample point q without replacement in one batch; and dist(p,q) refers to the Euclidean distance between the sample point p and the sample point q;

when the value of OutlierSet(r,s) is greater than a pre-set threshold, an outlier is determined, and the corresponding first sample point is eliminated.

acquiring historical GR curve data of a drilled well;

Step S200, eliminating outliers from the GR curve of the current batch to obtain GR parameter data while drilling with outliers eliminated; Due to the influence of instrument and wellbore environment, the standard quantitative linkage calculation can be realized by calculating the Euclidean distance between sample points and setting the discriminant distance r and discriminant ratio s;

In this embodiment, the Step S200 specifically comprises:

Step S210, calculating a mean estimation value $GR_{mean}$ and a variance estimation value $GR_{var}$ of the GR curve data with outliers eliminated of the current batch;

$$GR_{mean} = \frac{\sum_{i=1}^{i=Card(batch)} GR_i}{\text{Card(batch)}};$$

$$GR_{var} = \sqrt{\frac{1}{\text{Card(batch)}} \sum_{j=1}^{N} (GR_j - GRG_{mean})^2};$$

where Card(batch) represents a counting operator in a batch; j represents a sample sequence number; i represents a sample sequence number; and N has the same value as Card(batch);

Step S220, calculating a standard deviation of the historical GR curve data, and performing a stretching and compression transformation on the GR curve data with outliers eliminated of the current batch;

$$\text{stretch}_k = GR_{mean} + (GR_k - GR_{mean}) * \frac{\sigma_h}{GR_{var}};$$

where $\text{stretch}_k$ represents the GR data obtained after the stretching and compression transformation; and $GR_k$ represents the GR value of the kth sample point of the GR curve data with outliers eliminated of the current batch; and Step S230, performing a translation transformation on the GR data obtained after the stretching and compression transformation based on a mean value standard value $\mu_h$ of historical GR curve data;

$$\text{offset}_v = \text{stretch}_k + (\mu_h - GR_{mean});$$

where $\text{offset}_v$ represents the normalized GR while drilling parameter data obtained after translation transformation.

Step S300, determining the rationality of the normalized GR while drilling parameter data and historical GR curve data to obtain a rationality determination result; if the rationality determination result passes, proceeding to Step S400; if the rationality determination result fails, proceeding to Step S100, adjusting the determination condition of the outlier processing and re-performing the rationality determination; wherein rationality determination combines the abnormal value processing method with the standardized calculation, which can only retain valid information for subsequent inversion, compared with the ordinary method which separates the abnormal value elimination and the standardized calculation;

In this embodiment, the Step S300 specifically comprises:

Step S310, respectively calculating a probability distribution curve $L_1$ of the transformed GR while drilling parameter data and a probability distribution curve $L_2$ of GR parameter data of the drilled well;

wherein the probability distribution curve is specifically divided into N equal parts of data between the maximum value and the minimum value of the GR parameter data which have been acquired; counting the frequencies of intervals where the GR parameter belongs to the corresponding equal parts, and fitting to obtain the probability distribution curve.

Step S320, calculating a probability distribution curve area intersection set $U_1$ and a probability distribution curve area union set $U_2$ based on the Ly and $L_2$;

Step S330, calculating a quality control parameter $U=U_1/U_2$ based on the $U_1$ and $U_2$; and Step S340, comparing the quality control parameter U with a set quality control threshold;

if the quality control parameter U is greater than or equal to the set quality control threshold, the rationality determination result passes, proceeding to Step S400; and if the quality control parameter U is less than the set quality control threshold, the rationality determination result fails, proceeding to Step S100, and adjusting the determination radius r and the discrimination ratio s of the center of the circle.

Step S400, performing waveform indication inversion based on the historical GR curve data of the drilled well to obtain a waveform indication inversion data volume of the drilled well; wherein the GR curve has a clear corresponding relationship with lithology, which can be used to establish the corresponding relationship of predicted GR curve-lithology-actual drilling GR curve for depth correction to provide data basis;

In this embodiment, the Step S400 specifically comprises:
using the white noise satisfies the Gaussian distribution, representing historical GR curve data of the drilled well as:

$$Y_{sim}=X_{sim}+\xi_1;$$

where $Y_{sim}$ represents historical GR curve data of the drilled well; $X_{sim}$ represents a waveform indication inversion data volume to be solved of the drilled well; and $\xi_1$ represents random noise;

according to the central limit theorem, $\|X_{sim}-X_p\|^2$ also satisfies the Gaussian distribution, determining an initial objective function as:

$$J_1 = \frac{\|X_{sim}-X_p\|^2}{2\sigma^2};$$

where $J_1$ represents a function related to the posterior information; $X_p$ represents an expected value of the GR curve calculated by obtaining the posterior probability statistical distribution density after matching and filtering historical GR curve data of the drilled well; and $\sigma^2$ represents the covariance of the white noise;

based on the initial objective function, introducing priori information into the objective function through maximum a posteriori estimation to obtain a stable objective function as:

$$J(Z_{sim})=J_1(Z_{sim})+\lambda^2 J_2(Z_{sim});$$

wherein $Z_{sim}$ represents a simulated characteristic parameter; $J_2$ represents a function related to prior information of geological and logging data; and $\lambda$ represents a smoothing parameter for coordinating the interaction between $J_1$ and $J_2$; and taking the stable objective function as an input of the initial model, sampling the posterior probability distribution by the Markov chain Monte Carlo (MCMC) method and the Metropolis-Hastings sampling criterion, continuously optimizing the parameters of the initial model, selecting the solution when the objective function takes the maximum value as a random implementation, taking the mean value of multiple random implementations as an expected value output, and taking the expected value output as the waveform indication inversion data volume of the drilled well;

Step S500, acquiring a pre-drilling predicted well curve based on the waveform indication inversion data volume of the drilled well and a pre-designed drilling trajectory;

Step S600, performing variance attribute feature extraction based on the normalized GR while drilling parameter data to obtain a real-time updated variance attribute while drilling curve; and perform variance attribute feature extraction based on the pre-drilling predicted well curve to obtain a variance attribute curve of the pre-drilling predicted well curve;

wherein variance attribute is used to represent the rate of change of data and the lithologic interface is detected at the same time; there is obvious performance in the real-drilled GR curve or the drilled GR curve with an unstable sampling rate, so this scheme determines the control point according to the variance attribute;

in this embodiment, the Step S600 specifically comprises:

setting a time window with a size of w, based on the normalized GR while drilling parameter data, taking the serial number of the current actual measured point as MP, and calculating a local variance value MPvar within the range of (MP-w, MP):

$$MPvar = \frac{\sum_{n=1}^{n=w}(GR_n - \text{mean}(GR))^2}{w};$$

$$\text{mean}(GR) = \frac{\sum_{n=1}^{n=w}GR_n}{w};$$

where mean (GR) represents the local mean value of GR curve data; $GR_n$ represents the value of GR curve data of the nth sample point; and n represents the sequence number of the sample point;

calculating the local variance values of all the actual measured points to obtain the variance attribute while drilling curve; and performing variance attribute feature extraction on the pre-drilling predicted well curve through the same size w window to obtain a variance attribute curve of the pre-drilling predicted well curve.

Step S700, performing derivation based on the real-time updated variance attribute while drilling curve to obtain a real-time updated formation change-point detection result; and performing derivation based on the variance attribute curve of the pre-drilling predicted well curve to obtain a formation change-point detection result of the pre-drilling predicted well curve;

In this embodiment, the Step S700 specifically comprises:

performing derivation based on the variance attribute while drilling curve to obtain a first variance transient attribute dvar:

$$dvar = der(MPvar);$$

where der represents a derivation operator; the maximum value of the first variance transient attribute is a real-time updated formation change-point detection result, and at least two change-points are obtained, namely, a second change-point $Z_2$ and a fourth change-point $Z_4$;

performing derivation based on the variance attribute curve of the pre-drilling predicted well curve to obtain a second variance transient attribute, wherein the maximum value of the second variance transient attribute is the formation change-point detection result of the pre-drilling predicted well curve.

Step S800, acquiring 4 set control points based on the real-time updated formation change-point detection result and the formation change-point detection result of the pre-drilling prediction well curve, and performing depth transformation based on the 4 set control points to obtain an accurate depth while drilling; and In the present embodiment, the 4 control points specifically comprise:

a first control point: point $Z_1$ of the pre-drilling predicted well curve with a measured depth of zero, the depth being TVD($Z_1$);

a second control point: formation change-point $Z_2$ of the pre-drilling predicted well curve, the depth being TVD ($Z_2$);

a third control point: point $Z_3$ of the LWD curve with a measured depth of zero, the depth being TVD ($Z_3$); and a fourth control point: formation change-point $Z_4$ of the LWD curve, the depth being TVD ($Z_4$).

In the present embodiment, said performing a depth transformation based on the 4 set control points to obtain an accurate depth while drilling specifically comprises:

$$TTVD(d) = TVD(Z_3) + \frac{(TVD(Z_2) - TVD(Z_1))}{(TVD(Z_4) - TVD(Z_3))} * (TVD(d) - TVD(Z_3));$$

where TTVD(d) represents the accurate depth corresponding to the dth sample point after depth transformation, and TVD(d) represents the depth value corresponding to the dth sample point after depth transformation.

Step S900, completing accurate depth correction of the current batch based on the accurate depth while drilling, and returning to Step S100, determining the accurate depth while drilling based on GR while drilling parameter data of the next batch.

Although the foregoing embodiments describe the steps in sequential order, those skilled in the art will appreciate that the various steps need not be performed in such an order to achieve the benefits of the present embodiments, and that they may be performed simultaneously (in parallel) or in an inverted order, and that such simple variations are within the scope of the present invention.

A system for GR while drilling parameter data optimization for deep-field oil and gas precision navigation according to a second embodiment of the present invention comprises:

an outlier elimination module configured to acquire GR while drilling parameter data in real-time and perform outlier processing to obtain GR curve data with outliers eliminated, the GR while drilling parameter data being obtained in the form of a batch, and acquire historical GR curve data of a drilled well;

a normalization module configured to stretch and translate the GR curve data with outliers eliminated of the current batch according to the historical GR curve data to obtain a normalized GR while drilling parameter data;

a rationality determination module configured to determine the rationality of the normalized GR while drilling parameter data and historical GR curve data to obtain a rationality determination result; if the rationality determination result passes, proceed to a waveform indication inversion module; if the rationality determination result fails, proceed to an outlier eliminating module, adjust the determination condition of the outlier processing and re-perform the rationality determination;

the waveform indication inversion module configured to perform waveform indication inversion based on the historical GR curve data of the drilled well to obtain a waveform indication inversion data volume of the drilled well;

a pre-drilling predicted well curve calculation module configured to acquire a pre-drilling predicted well curve based on the waveform indication inversion data volume of the drilled well and a pre-designed drilling trajectory;

a variance attribute curve calculation module configured to perform variance attribute feature extraction based on the normalized GR while drilling parameter data to obtain a real-time updated variance attribute while drilling curve; and perform variance attribute feature extraction based on the pre-drilling predicted well curve to obtain a variance attribute curve of the pre-drilling predicted well curve;

a change-point detection module configured to perform derivation based on the real-time updated variance attribute while drilling curve to obtain a real-time updated formation change-point detection result; and perform derivation based on the variance attribute curve of the pre-drilling predicted well curve to obtain a formation change-point detection result of the pre-drilling predicted well curve;

an accurate depth calculation module configured to acquire 4 set control points based on the real-time updated formation change-point detection result and the formation change-point detection result of the pre-drilling prediction well curve, and perform depth transformation based on the 4 set control points to obtain an accurate depth while drilling; and a depth correction module configured to complete accurate depth correction of the current batch based on the accurate depth while drilling, and return to the outlier eliminating module to determine the accurate depth while drilling based on GR while drilling parameter data of the next batch.

It will be clear to a person skilled in the art that, for the convenience and brevity of the description, specific working procedures and related descriptions of the above-described systems may be referred to corresponding procedures in the preceding method embodiments and will not be described in detail here.

It should be noted that the above-mentioned embodiment provides a system for GR while drilling parameter data optimization for deep-field oil and gas precision navigation, which is merely exemplified by the division of the above-mentioned functional modules. In practical applications, the above-mentioned functional allocation may be performed by different functional modules according to needs, i.e. the modules or steps in the embodiment of the present invention are re-decomposed or combined, for example, the modules of the above-mentioned embodiment may be combined into one module, and may be further divided into a plurality of sub-modules so as to perform all or part of the functions described above. The names of the modules and steps involved in the embodiments of the present invention are merely to distinguish between the various modules or steps and are not to be construed as unduly limiting the present invention.

It will be clear to a person skilled in the art that, for the convenience and brevity of the description, specific working procedures and related descriptions of the above-described storage and processing devices may be referred to corresponding procedures in the preceding method embodiments and will not be described in detail here.

Those skilled in the art should appreciate that the various illustrative modules, method steps, and programs described in connection with the embodiments disclosed herein may be implemented as electronic hardware, computer software, or combinations of both and that the corresponding software modules, method steps, and programs may be located in an RAM, a memory, an ROM, an electrically programmable ROM, an electrically erasable programmable ROM, a register, a hard disk, a removable disk, a CD-ROM, or any other form of storage medium known in the art. To clearly illustrate this interchangeability of electronic hardware and software, various illustrative components and steps have been described above generally in terms of their functionality. Whether such functionality is implemented as electronic hardware or software depends upon the particular application and design constraints imposed on the implementation. Skilled artisans may implement the described functionality in varying ways for each particular application, but such implementation decisions should not be interpreted as causing a departure from the scope of the present invention.

The terms "first", "second", and the like are used for distinguishing between similar objects and not for describing or representing a particular sequential or chronological order.

The term "including" or any other similar term is intended to encompass non-exclusive inclusion, such that a process, method, item, or equipment/device that includes a series of elements not only includes those elements, but also includes other elements that are not explicitly listed, or also includes the inherent elements of the process, method, item, or equipment/device.

So far, the technical solutions of the present invention have been described with reference to the preferred embodiments shown in the accompanying drawings, but it is readily understood by those skilled in the art that the scope of protection of the present invention is obviously not limited to these specific embodiments. Equivalent changes or substitutions may be made by those skilled in the art to the relevant features without departing from the principles of the present invention, and all such changes or substitutions are intended to be within the scope of the present invention.

What is claimed is:

1. A method for obtaining a depth while drilling, comprising:
    acquiring, using a drilling instrument, while drilling data;
    acquiring historical data of a drilled well;
    obtaining a real-time updated formation change-point detection result based on the while drilling data;
    obtaining a pre-drilling predicted formation change-point detection result based on the data of the drilled well;
    setting 4 control points with different depths based on the real-time updated formation change-point detection result and the pre-drilling predicted formation change-point detection result;
    obtaining the depth while drilling based on the 4 control points by performing a depth transformation; and
    detecting a lithologic parameter, and correcting the depth while drilling based at least on the detected lithologic parameter.

2. The method according to claim 1, wherein setting 4 control points comprises:
    setting a first control point and a second control point based on the pre-drilling predicted formation change-point detection result, the first control point and the second control point having different depths; and
    setting a third control point and a fourth control point based on the real-time updated formation change-point detection result, the third control point and the fourth control point having different depths.

* * * * *